(12) United States Patent
Prullage

(10) Patent No.: US 6,925,750 B1
(45) Date of Patent: Aug. 9, 2005

(54) INSECT BAIT STATION

(75) Inventor: Joseph B. Prullage, Flower Mound, TX (US)

(73) Assignee: Wellmark International, Schaumberg, IL (US)

( * ) Notice: Subject to any disclaimer, the term of this patent is extended or adjusted under 35 U.S.C. 154(b) by 0 days.

(21) Appl. No.: 09/441,035

(22) Filed: Nov. 16, 1999

(51) Int. Cl.⁷ .............................................. A01M 1/20
(52) U.S. Cl. ...................................................... 43/131
(58) Field of Search .......................................... 43/131

(56) References Cited

U.S. PATENT DOCUMENTS

| | | | | |
|---|---|---|---|---|
| 1,236,245 A | * | 8/1917 | Abadie | 43/131 |
| 1,286,763 A | * | 12/1918 | Pfeiffer | 43/131 |
| 2,101,988 A | * | 12/1937 | Epstein | 43/131 |
| 2,547,314 A | * | 4/1951 | Grant | 43/131 |
| 3,147,565 A | * | 9/1964 | Moore | 43/131 |
| 3,603,022 A | * | 9/1971 | Asher et al. | 43/131 |
| 4,065,872 A | * | 1/1978 | Patton et al. | 43/131 |
| 4,310,985 A | * | 1/1982 | Foster et al. | 43/131 |
| 4,671,010 A | * | 6/1987 | Conlee et al. | 43/114 |
| 4,908,977 A | * | 3/1990 | Foster | 43/107 |
| 5,231,792 A | | 8/1993 | Warner | 43/122 |
| 5,237,774 A | | 8/1993 | Warner | 43/131 |
| 5,392,558 A | | 2/1995 | Blomquist | 43/107 |
| 5,528,854 A | * | 6/1996 | Antonali et al. | 43/131 |
| 5,749,168 A | * | 5/1998 | Chrysanthis | 43/122 |

OTHER PUBLICATIONS

Quikstrike™ Insect Bait Station. Commercial Sale: Spring 1995.

* cited by examiner

*Primary Examiner*—Kurt Rowan
(74) *Attorney, Agent, or Firm*—Townsend and Townsend and Crew LLP

(57) ABSTRACT

The present invention provides a fly bait station that maximizes the number of edges that a fly can rest. Flies are attracted to a surface's edge and to baits that give off odors. The present invention relates to an insect bait station for attracting and killing an insect such as flies, wherein the station comprises a body having an external groove for supporting a pesticide. The fly bait is held in the external groove. In preferred embodiments, there are a plurality of external grooves on the body. The external groove covers at least 30% of the total area of the external area of the body.

19 Claims, 3 Drawing Sheets

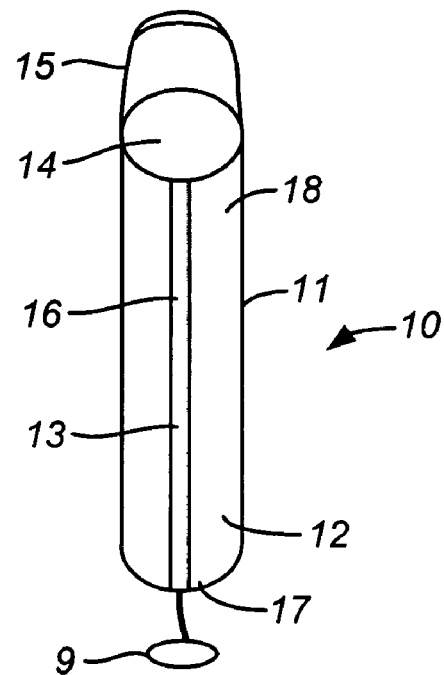
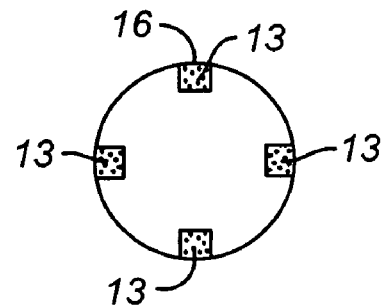
FIG. 1B
FIG. 1A
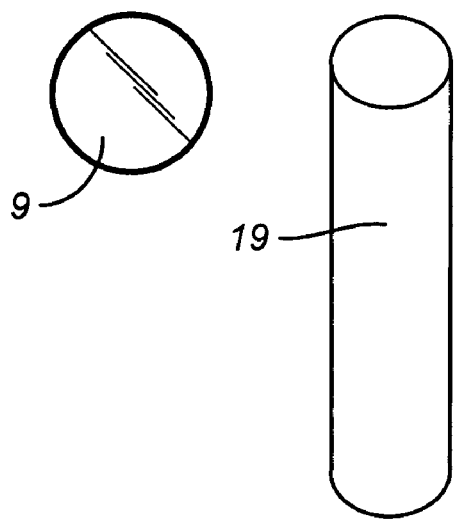
FIG. 1C

INSECT BAIT STATION

FIELD OF THE INVENTION

In general, this invention relates to an insect bait station, and in particular, to an insect bait station designed especially for flies.

BACKGROUND OF THE INVENTION

The house fly, Musca domestica Linnaeus, is a well-known pest of both farm and home. This species is commonly found in association with humans or activities of humans, and is one of the most common species found on hog and poultry farms, horse stables, and ranches. In addition to being a nuisance, the fly can transport disease-causing microorganisms. Moreover, excessive fly populations are obnoxious to farm workers.

Besides being a nuisance, the fly is a prime carrier of disease. Various pathogens associated with the house fly can cause disease in humans and animals, including typhoid, cholera, dysentery, tuberculosis, anthrax ophthalmia and infantile diarrhea, as well as parasitic worms. Pathogenic microorganisms are picked up by flies from garbage, sewage and other sources of filth, and then transferred on their mouth parts and other body parts, through their vomitus, feces and contaminated external body parts to human and animal food.

The flies are inactive at night, with ceilings, beams and overhead wires within buildings, trees, and shrubs, various kinds of outdoor wires, and grasses reported as overnight resting sites. In poultry farms, the outdoor aggregations of flies at night are found in various protected sites, whereas almost all of the indoor populations are generally aggregated in the ceiling area of poultry houses.

Unfortunately, flies develop in large numbers in livestock areas, such as poultry manure under caged hens. This is a serious problem requiring control. The control of Musca domestica is vital to human health and comfort in many areas of the world. The most important damage related with this insect is the annoyance and the indirect damage produced by the potential transmission of various pathogens associated therewith.

Various methods have been developed to control the fly. The most common control measures involves the use of traps and insecticides. Fly bait stations can be useful in some fly control programs if enough bait stations are used, and if they are placed correctly. The control of this insect is by the application of adulticides, larvicides, or combinations thereof to directly or indirectly suppress adult densities.

U.S. Pat. No. 5,237,774, which issued to Warner on Aug. 24, 1993, discloses an container for holding granular insecticide. As described therein, the central chamber has a narrow rectangular cross-sectional area. A multiplicity of rectangular slots are formed in rows and columns in the chamber to provide the insect access to the insecticide. The slots are so dimensioned as to contain the granular insecticide and still permit access to the feeding parts of the insect. However, the design is limited in that it is only useful for granulated formulations of insecticide.

House flies are attracted to white surfaces and to baits that give off odors. Moreover, they preferably rest on sunny surfaces such as a surface edge in the daytime, and tend to come inside buildings or under eaves to roost at night. In view of the tremendous nuisance of flying insects in and around livestock, an insect bait station is needed that is simple, easy to use and that maximize the number of edges that an insect can rest. The present invention fulfills these and other needs.

SUMMARY OF THE INVENTION

The present invention provides an insect bait station that maximizes the number of edges that an insect such as a fly, can rest. Flies are attracted to a surface's edge and to baits that give off odors. The present invention relates to an insect bait station for attracting and killing an insect such as a fly, wherein the bait station comprises a body having an external groove for supporting a pesticide. The pesticide is held in the external groove. In preferred embodiments, there are a plurality of external grooves on the body. In certain aspects, the external groove covers at least 30% of the total area of the external area of the body.

In certain embodiments, the body is configured to be a cylinder or sphere. Preferably, the external grooves are recessed from the surface of the cylinder or sphere. The grooves are dimensioned to maximize the surface area to expose the pesticide. In certain aspects, the body is configured as a cylinder with elongated grooves. Alternatively, the groove can be circumferential. Preferably, the body has an external surface oriented generally vertically, wherein the external surface includes at least one groove configured to support a pesticide of a viscous liquid or solid formulation so that the pesticide is exposed to the external surface of the body. In operation, the insect such as a fly, is attracted to the bait station because of its numerous surface edges. An insecticide, such as a nitromethylene insecticide, is disposed within the groove. The fly lands on the station, eats an insecticide and dies.

In certain embodiments, the bait station of the present invention is fabricated, such as from plastics, through an extrusion molding process. An attractant, such as an insect pheromone, can be molded into the plastic itself. Alternatively, a reservoir for an attractant is affixed to the bottom of the body.

In certain embodiments, the bait station of the present invention is disposable. It is packaged in a sheath configured similarly to the bait station and requires no assembly.

In another embodiment, the present invention provides a method for killing insects, comprising: providing a body having at least one external groove on an external surface to provide one or more edges for insects to land; and applying a self-adhering pesticide on the external groove to expose the pesticide to the external surface of the body and place the pesticide at or near the one or more edges. Further features and embodiments will become more apparent when read with the accompanying drawings and detailed description which follow.

BRIEF DESCRIPTION OF THE DRAWINGS

FIGS. 1A, B and C illustrate (A) a perspective view of one embodiment of the present invention; (B) a top view of one embodiment of the present invention and (C) a perspective view of one embodiment of a sheath of the present invention.

DETAILED DESCRIPTION OF THE INVENTION AND PREFERRED EMBODIMENTS

Figure 2A:
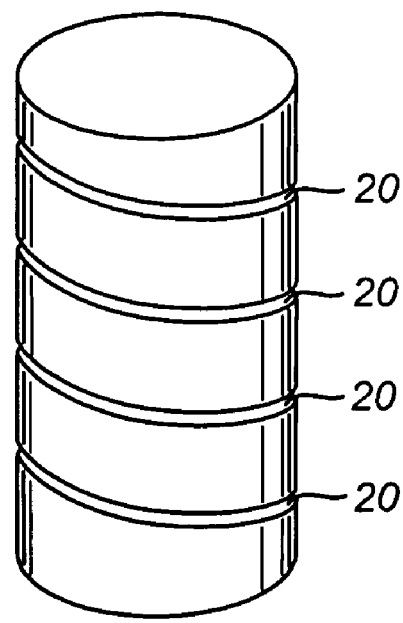
FIGS. 2A and B illustrate perspective views of various embodiments of the present invention.

Besides being a nuisance, a house fly is a prime carrier of disease. Various pathogens associated with the fly can cause disease in humans and animals, including typhoid, cholera, dysentery, tuberculosis, anthrax ophthalmia and infantile diarrhea, as well as parasitic worms. As the fly is a ubiquitous pest, it is imperative that flies be controlled in an easy cost efficient manner. As such, the present invention provides an insect bait station for killing an insect comprising a body having an external groove for supporting a pesticide. Preferably, the body is oriented generally vertically, wherein the external surface of the body comprises at least one groove configured to support a pesticide of a viscous liquid or solid formulation. Preferably, the pesticide is exposed to the external surface of the body.

With regard to FIG. 1, a preferred embodiment of the insect bait station of the present invention is illustrated. The insect bait station 10 comprises a body 11 that includes a interior 14 configured generally as a cylinder. The interior 14 is optionally hollow. The external surface 12 of the body has at least one groove 13 extending generally longitudinally along the length of the cylindrical body. The cylinder preferably has a diameter of between about ¼ inch to about 2 inches, and is between about 6 inches to about 18 inches in length. Although in certain embodiments the exterior surface of the insect bait station of the present invention is smooth, in other aspects, the insect bait station has a rough external surface.

Optionally, the insect bait station comprises a hanger member 15 connected to the body. The hanger member is conveniently affixed to the body with conventional means. In certain aspects, the hanger member 15 is molded to the body during fabrication. The hanger 15 enables the insect bait station to be hung or suspended above the floor or ground. A hanging insect bait station is advantageous because resting flies move above the ground and the insect bait station is out of the way from human or mammalian contact.

In preferred aspects, the height of the groove is at least two times larger than the width of the groove. In certain aspects, the groove covers an area of the external surface equal to at least about 30% of the total area of the external surface. Preferably, the groove or plurality of grooves maximizes the surface area of the exterior surface of the body.

The body 11 has a top portion 18 and a bottom portion 17. Optionally, the bottom portion includes an attractant reservoir 9 affixed thereto. The attractant reservoir can be affixed by conventional means. Alternatively, in certain embodiments, the attractant, such as pheromone or feeding attractant, can be included in the material used to formulate the body during an extrusion molding process. Various pheromones are suitable for use in the present invention including, but not limited to, Z-9 tricosene, DANKA and other suitable sex pheromones.

With reference to the top sectional view of FIG. 1B, in certain aspects, the body has a plurality of grooves 13. The groove or grooves are configured to support a pesticide 16. The pesticide is generally a viscous liquid or solid formulation. In certain aspects, the pesticide sticks to the body and stays within the groove even under the force of gravity. Various pesticides are suitable for use in the present invention and are discussed hereinbelow.

In certain embodiments, the insect bait station of the present invention is disposable after use. The insect bait station is packaged in a sheath that is configured similarly as the body. With reference to FIG. 1C, in certain aspects, the sheath 19 is dimensioned to fit over the insect bait station. The sheath includes a sheath top or lid 9. A cover or strip is removed from the groove and the self-adhering pesticide bait is exposed. In certain embodiments, the sheath is configured to hold multiple bait stations.

Figure 2B:
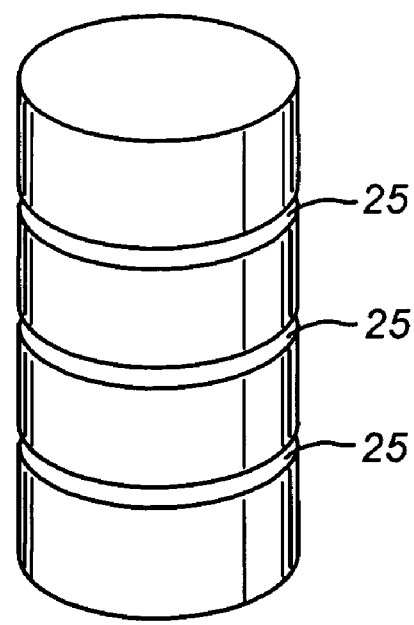

The groove or grooves can be configured to extend generally longitudinally about the length of the body. In another embodiment, the groove is configured to have various other configurations. With reference to FIG. 2A, the grooves 20 have a spiral slope. The embodiment in FIG. 2B illustrates grooves 25 that are generally circumferential. Grooves that maximize the external surface area of the body are preferred. Those of skill in the art will know of other groove configurations which are desirable for use in the present invention.

Figure 3:
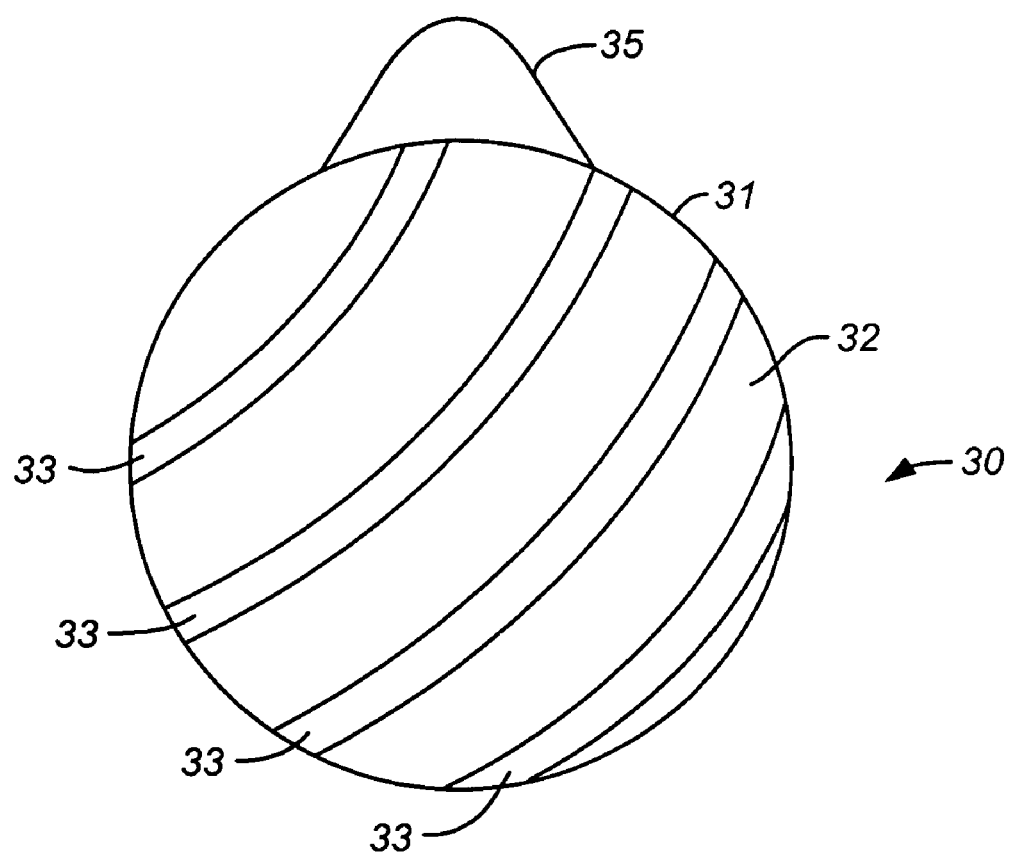
FIG. 3 illustrates a perspective view of one embodiment of the present invention.

Another embodiment of the invention is shown in FIG. 3. In this embodiment, the insect bait station 30 comprises a hollow body 31 that is configured generally to be a ball or sphere. The external surface 32 of the body has at least one groove or a plurality of grooves 33 extending generally latitudinally along the spherical body. The sphere preferably has a circumference of between about 4 inches to about 14 inches.

Optionally, the spherical insect bait station comprises a hanger member 35 connected to the body. The hanger member is conveniently affixed to the body with conventional means. In certain aspects, the hanger member 35 is molded to the body during fabrication.

In general, it is not known whether flies can distinguish colors. An excited fly seeking escape often chooses a blue source whereas a calm fly settles on dark surfaces and often chooses a red surface. In certain instances, house flies are attracted to white surfaces and to baits that give off odors. Thus, although the body of the insect bait station of the present invention can be any color, preferably, the body is white or red.

The body of the insect bait station is configured to maximize the landing surface for the fly. Without being bound by a particular theory, it is believed that house flies prefer to land on a surface edge. The present invention incorporates this phenomena by maximizing the surface edges of the insect bait station. In operation, the flies rest on the station's exterior surface and pick up enough insecticide to kill them.

Various insecticides, pesticides or rodenticides are suitable for use in the present invention. These insecticides include, but are not limited to, fast acting insecticides such as nitromethylene insecticides. Preferably, the insecticide is a nitromethylene insecticide such as nithiazine (i.e. 2-nitromethylene-1,3-thiazinane) or nitenpyram (i.e. (E)-N-(6-chloro-3-pyridylmethyl)-N-ethyl-N'-methyl-2-nitrovinylidenediamine). Other suitable fast acting insecticides include the phenylpyrozole insecticides such as fipronil (5-amino-[2,6-dichloro -4- (trifluoromethyl)phenyl] -4- [(R,S)-trifluoromethyl)sulfinyl]-1H-pyrazole-3-carbonitrile). In certain embodiments, the pesticide formulation comprises of nithiazine mixed with sugar and mulled with an appropriate vehicle and then applied as a paste in the grooves of the bait station.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An insect bait station for killing *Musca domestica*, said station comprising:
   a cylindrical body having an external surface oriented generally vertically, said external surface comprising at least one recessed groove extending along substantially the entire longitudinal length of said cylindrical body, an oral insecticide of a viscous liquid or solid formulation supported by said at least one recessed groove so that said oral insecticide is exposed to said external surface of said body, wherein said oral insecticide is a member selected from the group consisting of a nitromethylene and a phenyl pyrazole; and wherein said external surface of said body provides one or more edges for insects to land on or near said oral insecticide whereby said oral insecticide is contained substantially in said recessed groove.

2. The insect bait station according to claim 1, wherein the height of said groove is at least two times larger than the width of said groove.

3. The insect bait station according to claim 1, wherein said body has a plurality of grooves.

4. The insect bait station according to claim 1, wherein said cylindrical body has a diameter of between about ¼ inch to about 2 inches.

5. The insect bait station according to claim 1, wherein said cylindrical body is between about 6 inches to about 18 inches in length.

6. The insect bait station according to claim 1, further comprising a hanger member connected to said body.

7. The insect bait station according to claim 1, wherein said body is extrusion molded.

8. The insect bait station according to claim 1, wherein said body is injection molded.

9. The insect bait station according to claim 1, wherein said oral insecticide sticks to said body under the force of gravity.

10. The insect bait station according to claim 1, wherein said oral insecticide is a fast acting oral insecticide.

11. The insect bait station according to claim 1, further comprising a pest attractant reservoir connected to said body.

12. The insect bait station according to claim 11, wherein said body has a top portion and a bottom portion, said pest attractant reservoir being affixed to said bottom portion.

13. The insect bait station according to claim 11, wherein said pest attractant reservoir being affixed to said hanger member.

14. The insect bait station according to claim 11, wherein said pest attractant is an insect pheromone.

15. The insect bait station according to claim 11, wherein said pest attractant is a feeding attractant.

16. The insect bait station according to claim 1, further comprising a cylinder sheath.

17. The insect bait station according to claim 1, wherein said at least one groove covers an area of the external surface equal to at least about 30% of the total area of said external surface.

18. A method for killing an insect, said method comprising:
   providing a station body according to claim 1; and
   applying a self-adhering oral insecticide on said external longitudinal recessed groove to expose said oral insecticide to said external surface and place said oral insecticide at or near said one or more edges.

19. The method according to claim 18, wherein said insect is a fly.

* * * * *